(12) United States Patent
Chen

(10) Patent No.: US 10,683,978 B2
(45) Date of Patent: Jun. 16, 2020

(54) LAMP POWER ASSEMBLING STRUCTURE AND METHOD

(71) Applicant: Chia-Lin Chen, Taipei (TW)

(72) Inventor: Chia-Lin Chen, Taipei (TW)

(73) Assignee: HAND-ON LIGHTING CO., LTD., Taipei (TW)

( * ) Notice: Subject to any disclaimer, the term of this patent is extended or adjusted under 35 U.S.C. 154(b) by 48 days.

(21) Appl. No.: 16/001,920

(22) Filed: Jun. 6, 2018

(65) Prior Publication Data
US 2019/0049081 A1 Feb. 14, 2019

(30) Foreign Application Priority Data
Aug. 14, 2017 (TW) ............................. 106127452 A

(51) Int. Cl.
*F21S 8/04* (2006.01)
*F21K 9/20* (2016.01)
(Continued)

(52) U.S. Cl.
CPC ................ *F21S 8/043* (2013.01); *F21K 9/20* (2016.08); *F21S 8/033* (2013.01); *F21V 19/003* (2013.01);
(Continued)

(58) Field of Classification Search
CPC ........... H01R 33/94; H01R 33/46; H02G 3/20
See application file for complete search history.

(56) References Cited

U.S. PATENT DOCUMENTS

| 4,645,286 A * | 2/1987 | Isban | H02G 3/20 |
| | | | 439/450 |
| 5,422,487 A * | 6/1995 | Sauska | C02F 1/325 |
| | | | 250/436 |

(Continued)

FOREIGN PATENT DOCUMENTS

| CN | 204201696 U | 3/2015 |
| CN | 206191432 U | 5/2017 |

(Continued)

OTHER PUBLICATIONS

Office Action dated Nov. 9, 2017 of the corresponding Taiwan patent applicaiton.

*Primary Examiner* — Tho D Ta
(74) *Attorney, Agent, or Firm* — Chun-Ming Shih; HDLS IPR Services

(57) ABSTRACT

A lamp power assembling structure and method, the lamp power assembling structure is installed indoors and is connected an indoor power source, and includes a lamp power seat and a lamp fixing seat. The lamp power seat has a first power connector for connecting to the indoor power source and two sliding trenches. Each sliding trench has an arced channel and an enlarged hole formed at an end of the arced channel. The lamp fixing seat has a second power connector corresponding to the first power connector and two fasteners separately corresponding to the two enlarged holes. The two fasteners are separately inserted into the two enlarged holes, and the lamp fixing seat is rotated about the first and second power connectors so as to make the two fasteners separately to be engaged with the arced channels to fix the lamp fixing seat to the lamp power seat.

7 Claims, 8 Drawing Sheets

(51) Int. Cl.
  *F21V 19/00*  (2006.01)
  *F21S 8/00*  (2006.01)
  *F21V 3/02*  (2006.01)
  *F21Y 105/18*  (2016.01)
  *F21Y 115/10*  (2016.01)
  *F21V 21/002*  (2006.01)
  *H01R 33/94*  (2006.01)
  *H02G 3/20*  (2006.01)
  *H01R 33/46*  (2006.01)
  *F16M 13/02*  (2006.01)

(52) U.S. Cl.
  CPC .............. *F16M 13/027* (2013.01); *F21V 3/02* (2013.01); *F21V 21/002* (2013.01); *F21Y 2105/18* (2016.08); *F21Y 2115/10* (2016.08); *H01R 33/46* (2013.01); *H01R 33/94* (2013.01); *H02G 3/20* (2013.01)

(56) References Cited

U.S. PATENT DOCUMENTS

| | | | | |
|---|---|---|---|---|
| 5,558,537 | A * | 9/1996 | Su | F21V 21/03 439/334 |
| 6,779,911 | B2 * | 8/2004 | Chang | F21V 19/006 362/147 |
| 7,064,269 | B2 * | 6/2006 | Smith | H01R 33/46 174/481 |
| 7,104,828 | B1 * | 9/2006 | Lin | F21V 19/006 362/430 |
| 7,748,886 | B2 * | 7/2010 | Pazula | H01R 33/94 362/353 |

FOREIGN PATENT DOCUMENTS

| | | | | |
|---|---|---|---|---|
| GB | 2320819 | A * | 7/1998 | H01R 33/05 |
| JP | 2012069511 | A | 4/2012 | |
| TW | M524426 | U | 6/2016 | |

* cited by examiner

LAMP POWER ASSEMBLING STRUCTURE AND METHOD

BACKGROUND OF THE INVENTION

1. Technical Field

The invention relates to lighting, particularly to a lamp power assembling structure and method.

2. Related Art

A lamp mounted on a ceiling is usually provided with a power socket to connect with a power plug connecting to an indoor power source. However, such a ceiling lamp must be upward installed to a ceiling with screws, so it is so inconvenient in installation, replacement or repair.

SUMMARY OF THE INVENTION

An object of the invention is to provide a lamp power assembling structure and method, which uses a lamp power seat to be mounted on a wall or ceiling first, and then uses a lamp fixing seat to fasten to the lamp power seat by rotating about the power source to make engagement. It is convenient to install, replace or repair a lamp.

To accomplish the above object, the invention provides a lamp power assembling structure for being installed indoors and connecting an indoor power source. It includes a lamp power seat and a lamp fixing seat. The lamp power seat has a first power connector for connecting to the indoor power source and two sliding trenches. Each sliding trench has an arced channel and an enlarged hole formed at an end of the arced channel. The lamp fixing seat has a second power connector corresponding to the first power connector and two fasteners separately corresponding to the two enlarged holes. The two fasteners are separately inserted into the two enlarged holes, and the lamp fixing seat is rotated about the first and second power connectors so as to make the two fasteners are separately engaged with the arced channels to fix the lamp fixing seat to the lamp power seat.

To accomplish the above object, the invention provides a lamp power assembling method, which includes the steps of:

a) preparing a lamp power seat and a lamp fixing seat for connecting with the lamp power seat, wherein the lamp power seat has a first power connector and the lamp fixing seat has a second power connector;

b) installing the lamp power seat indoors and connecting the first power connector to an indoor power source;

c) connecting the lamp fixing seat to the lamp power seat and making the first and second power connectors have an electric connection; and d) rotating the lamp fixing seat about the first and second power connectors to make the lamp fixing seat engage with the lamp power seat.

DETAILED DESCRIPTION OF THE INVENTION

Figure 1:
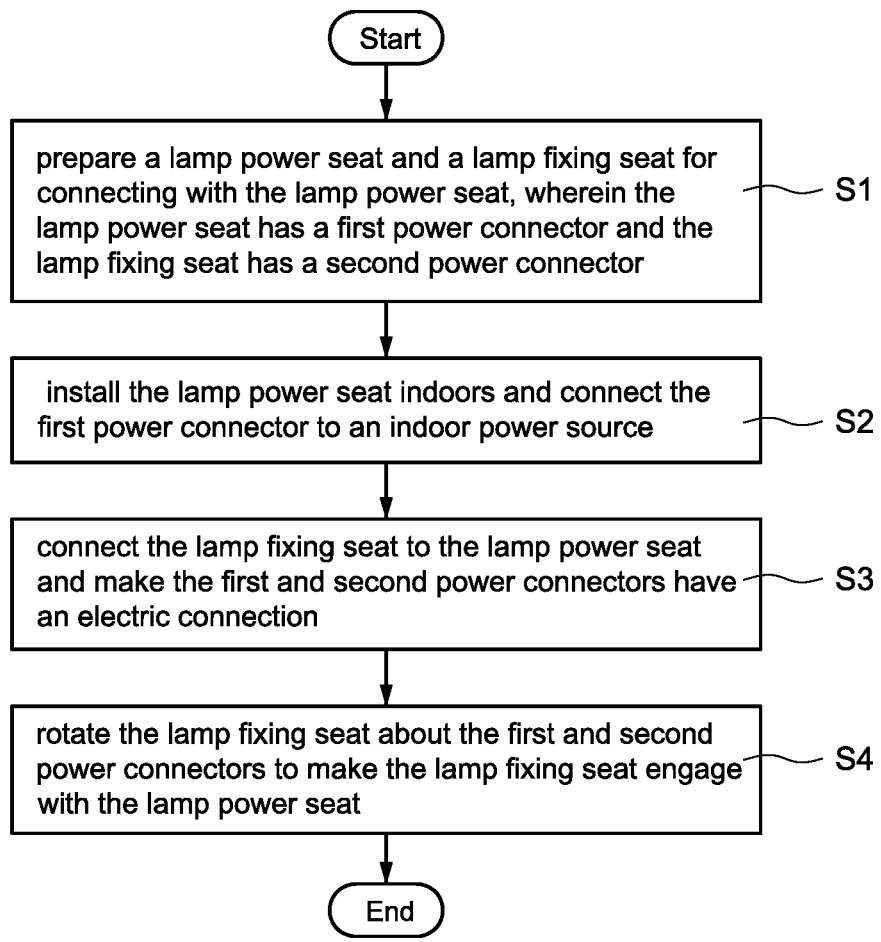
FIG. 1 is a flowchart of the assembling method of the invention.
Figure 2:
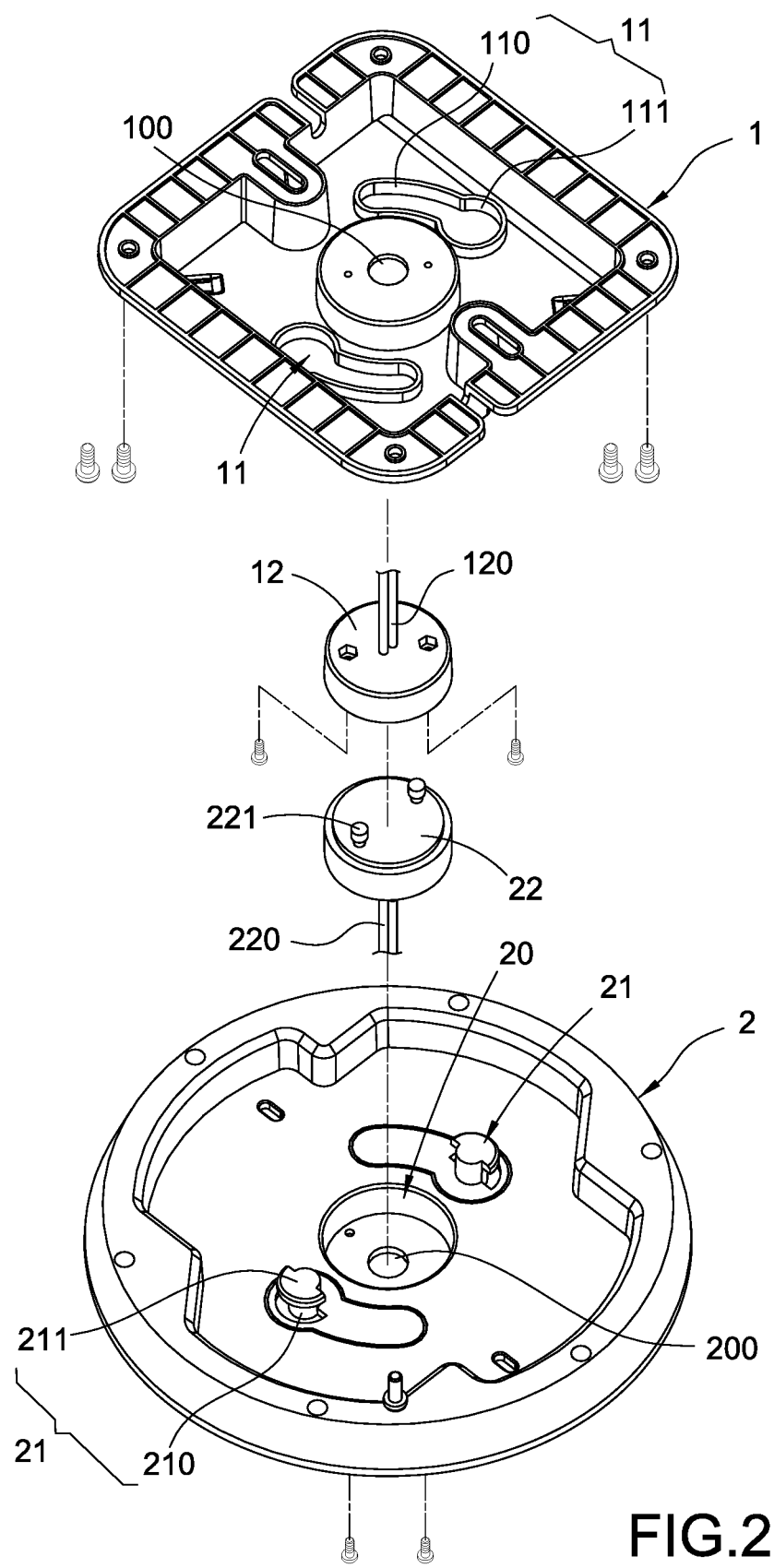
FIG. 2 is an exploded view of the assembling structure of the invention.
Figure 3:
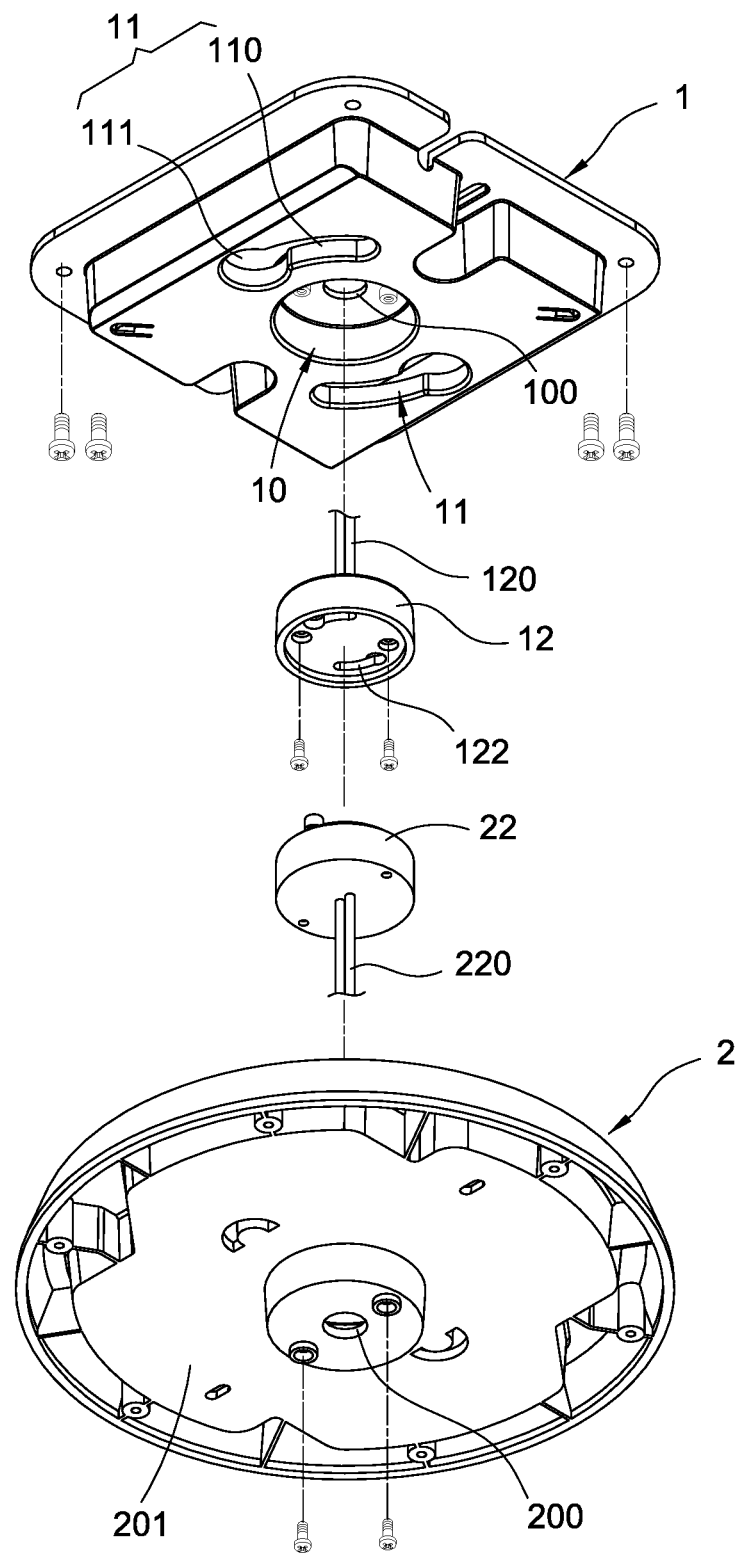
FIG. 3 is another exploded view of the assembling structure of the invention.
Figure 4:
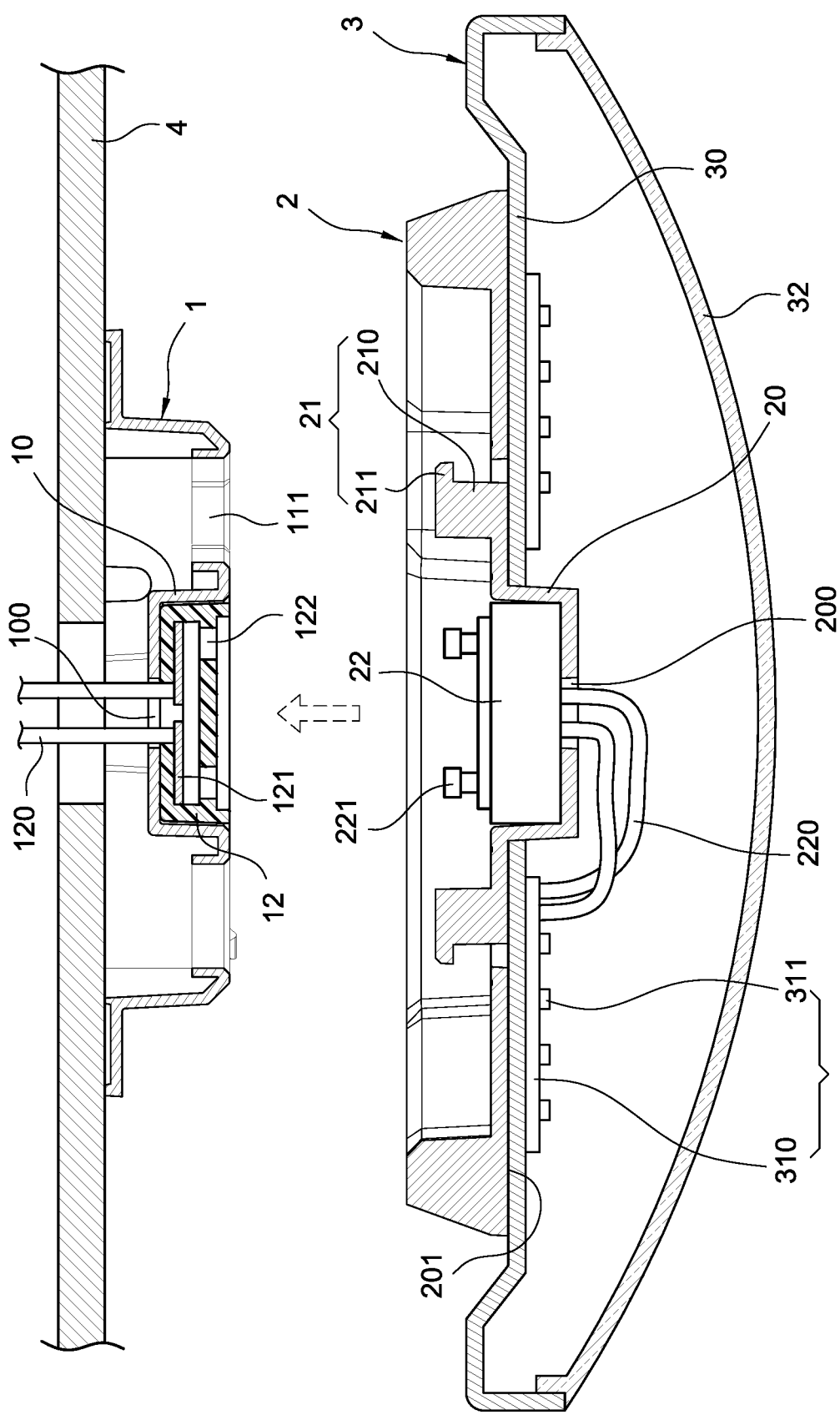
FIGS. 4-7 are schematic views of the assembling structure of the invention, which show the assembling operation.

Please refer to FIGS. 1-3. The invention provides a lamp power assembling structure and method. The lamp power assembling structure is used for being installed on a mounting place 4 (as shown in FIG. 4) such as a wall or ceiling and connecting to an indoor power source through the mounting place 4 to supply electricity to the lamp. The lamp power assembling structure includes a lamp power seat 1 and a lamp fixing seat 2 connected thereto. As shown in step S1 of FIG. 1, prepare the lamp power seat 1 and the lamp fixing seat 2. In the shown embodiment, the lamp power seat 1 is formed with a first receiving portion 10 and at least two sliding trenches 11. A first power connector 12 is received in the first receiving portion 10. The lamp fixing seat 2 is formed with a second receiving portion 20 and at least two fasteners 21. A second power connector 22 is received in the second receiving portion 20.

As shown in FIG. 4 and step S2 in FIG. 1, install the lamp power seat 1 on the mounting place 4 indoors and connect the first power connector 12 to an indoor power source. In the shown embodiment, a side of the lamp power seat 1, which is not provided with the first power connector 12, is attached on the mounting place 4. The other side which is provided with the first power connector 12 faces down. A wire 120 of the first power connector 12 passes through a first through hole 100 in the first receiving portion 10 and the mounting place 4 to connect a power source cable (not shown) behind the mounting place 4. Then the first power connector 12 is assembled onto the lamp power seat 1 by a removable manner such as screws. Additionally, the second power connector 22 can also be assembled onto the lamp fixing seat 2 by a removable manner such as screws.

Figure 5:
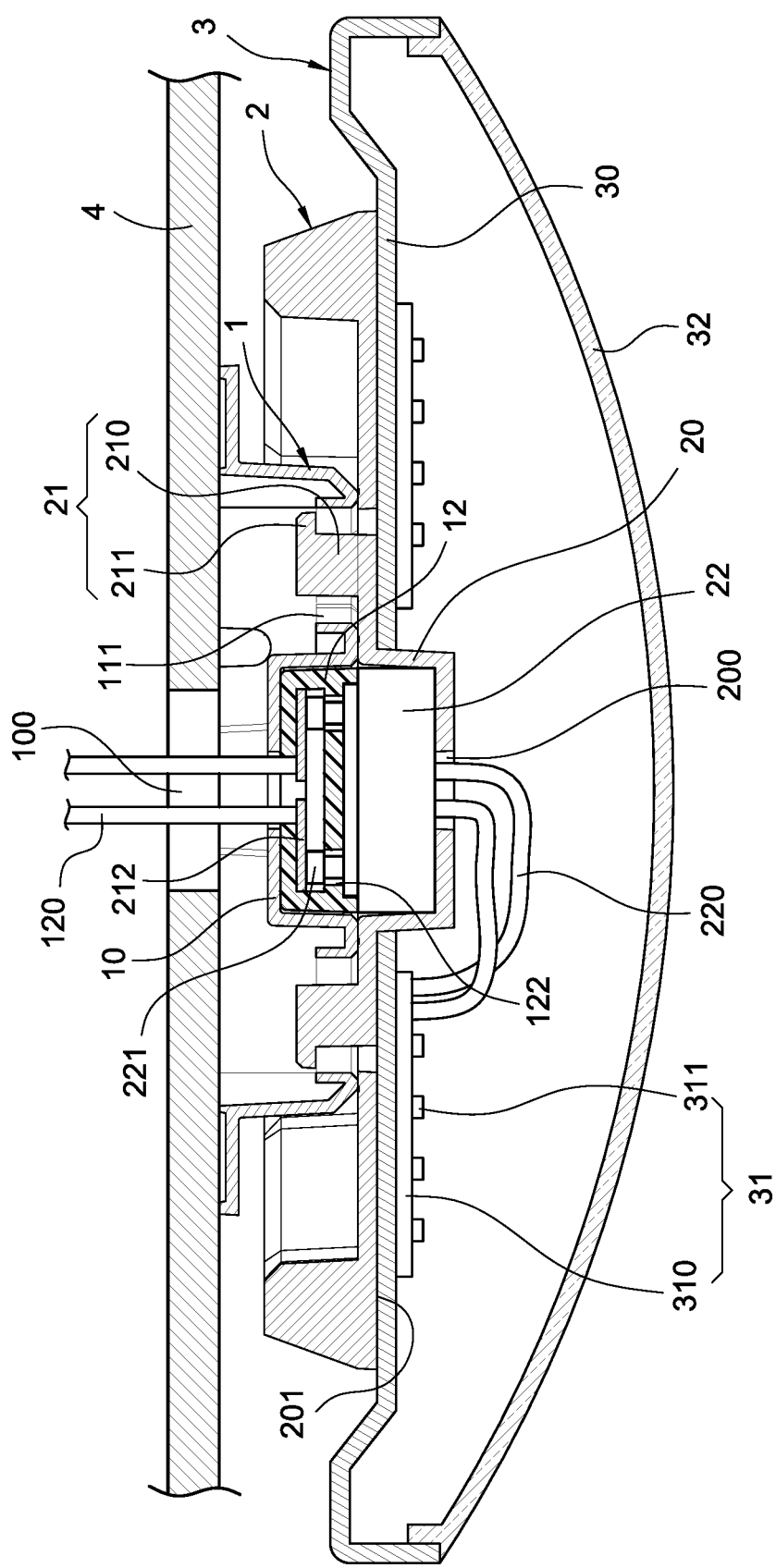

As shown in FIGS. 4-5 and step S3 in FIG. 1, connect the lamp fixing seat 2 to the lamp power seat 1 and make the first and second power connectors 12, 22 have an electric connection. The first power connector 12 is provided with a conductive portion 121 electrically connected to the wire 120. The second power connector 22 is formed with a conductive rod 221 electrically connected to its wire 220. The first power connector 12 is formed with an inserting trough 122 for being inserted by the conductive rod 221 to make an electric connection with the conductive portion 121. In the shown embodiment, a side of the lamp fixing seat 2, which is provided with the second power connector 22, is assembled toward the lamp power seat 1, and the other side thereof is formed with a lamp installing portion 201 for assembling with a lamp 3. And the lamp 3 is jointly fastened to the lamp fixing seat 2 and the lamp power seat 1. In detail, as shown in FIGS. 1 and 2, each sliding trench 11 has an arced channel 110 and an enlarged hole 111 formed at an end of the arced channel 110. The arced channels 110 are arranged around the first power connector 12. The fasteners 21 separately correspond to the two enlarged holes 111. The two fasteners 21 can be separately inserted into the two enlarged holes 111 when the lamp fixing seat 2 is fastened to the lamp power seat 1 as shown in FIG. 5.

Figure 6:
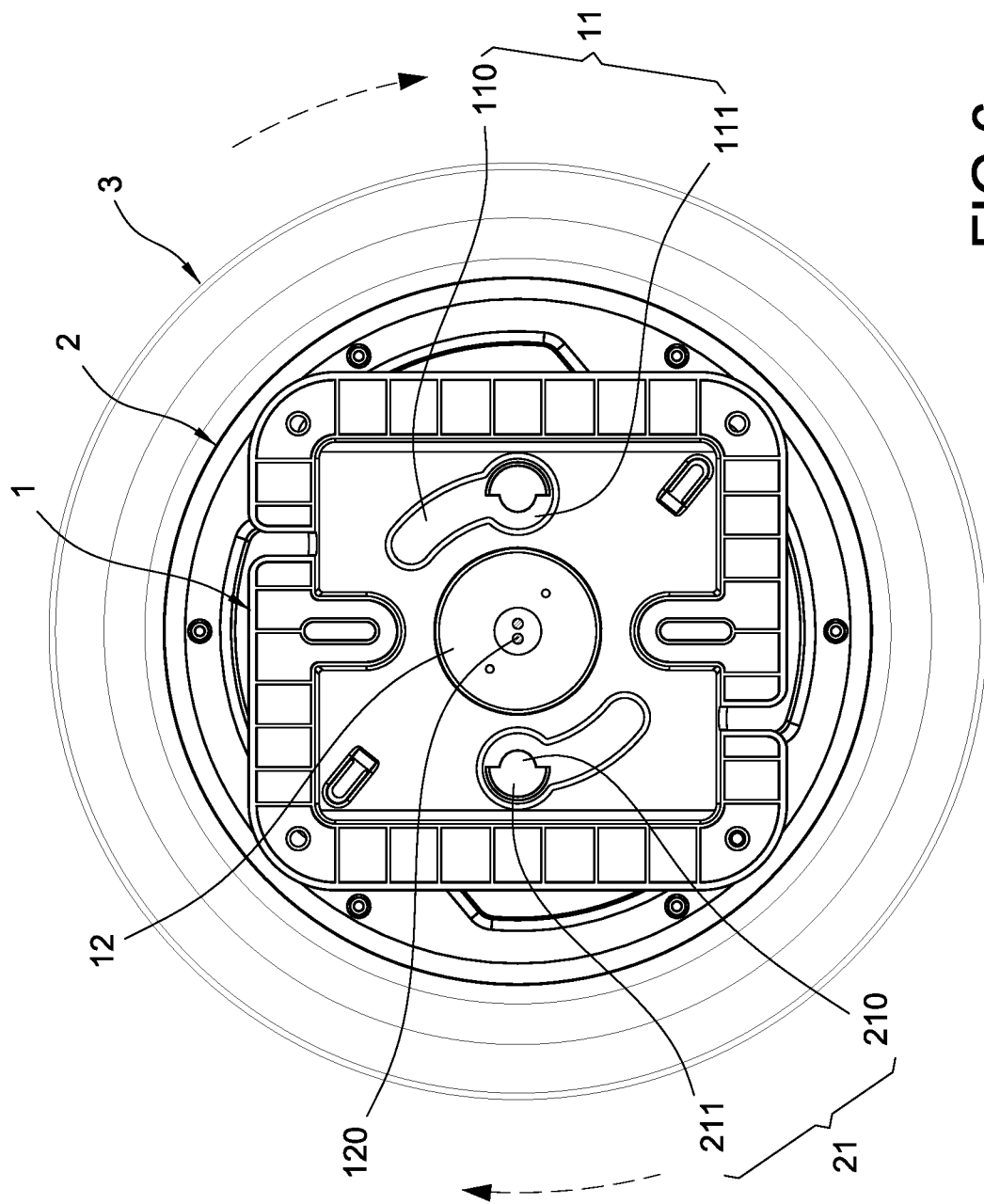
Figure 7:
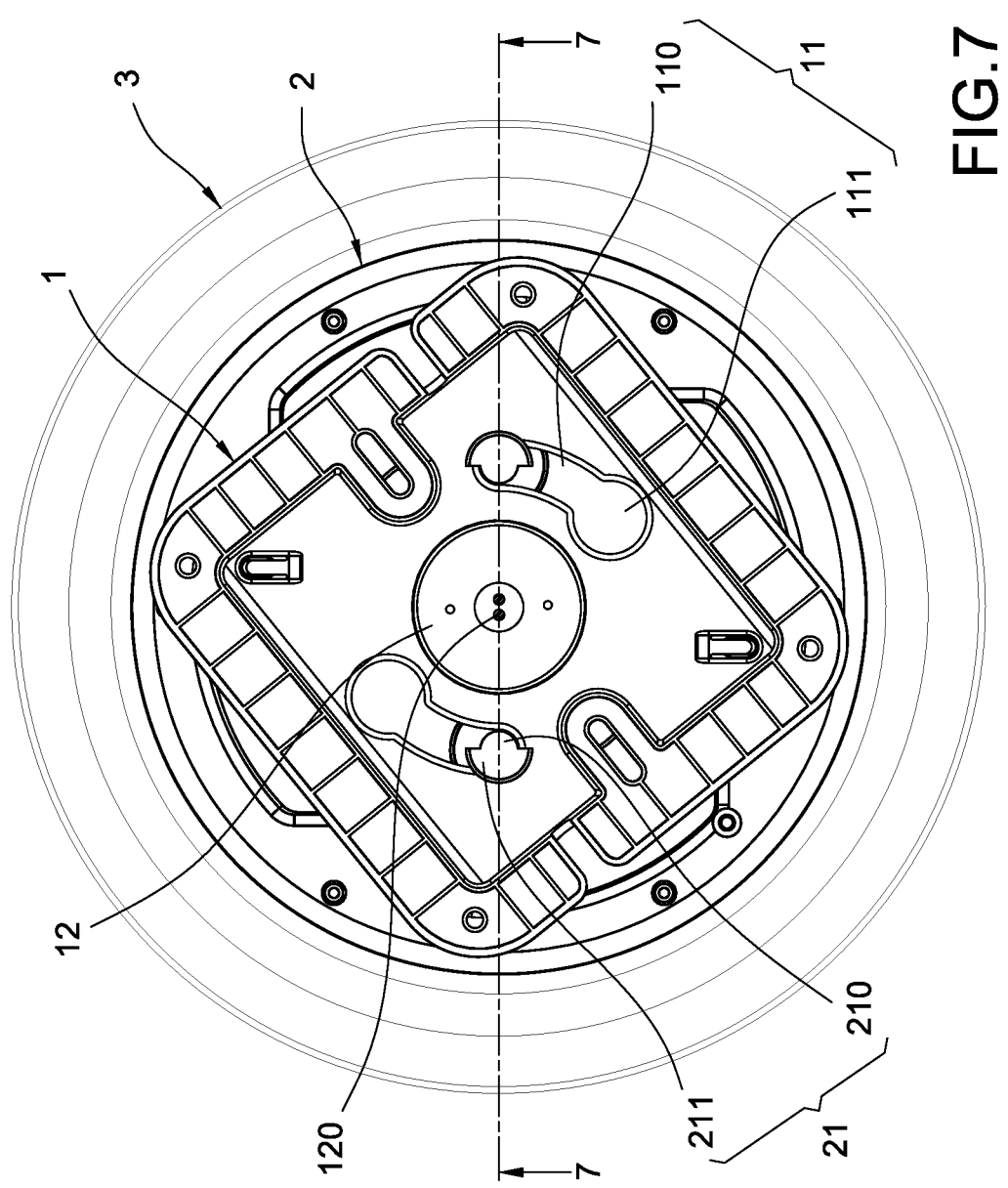
Figure 8:
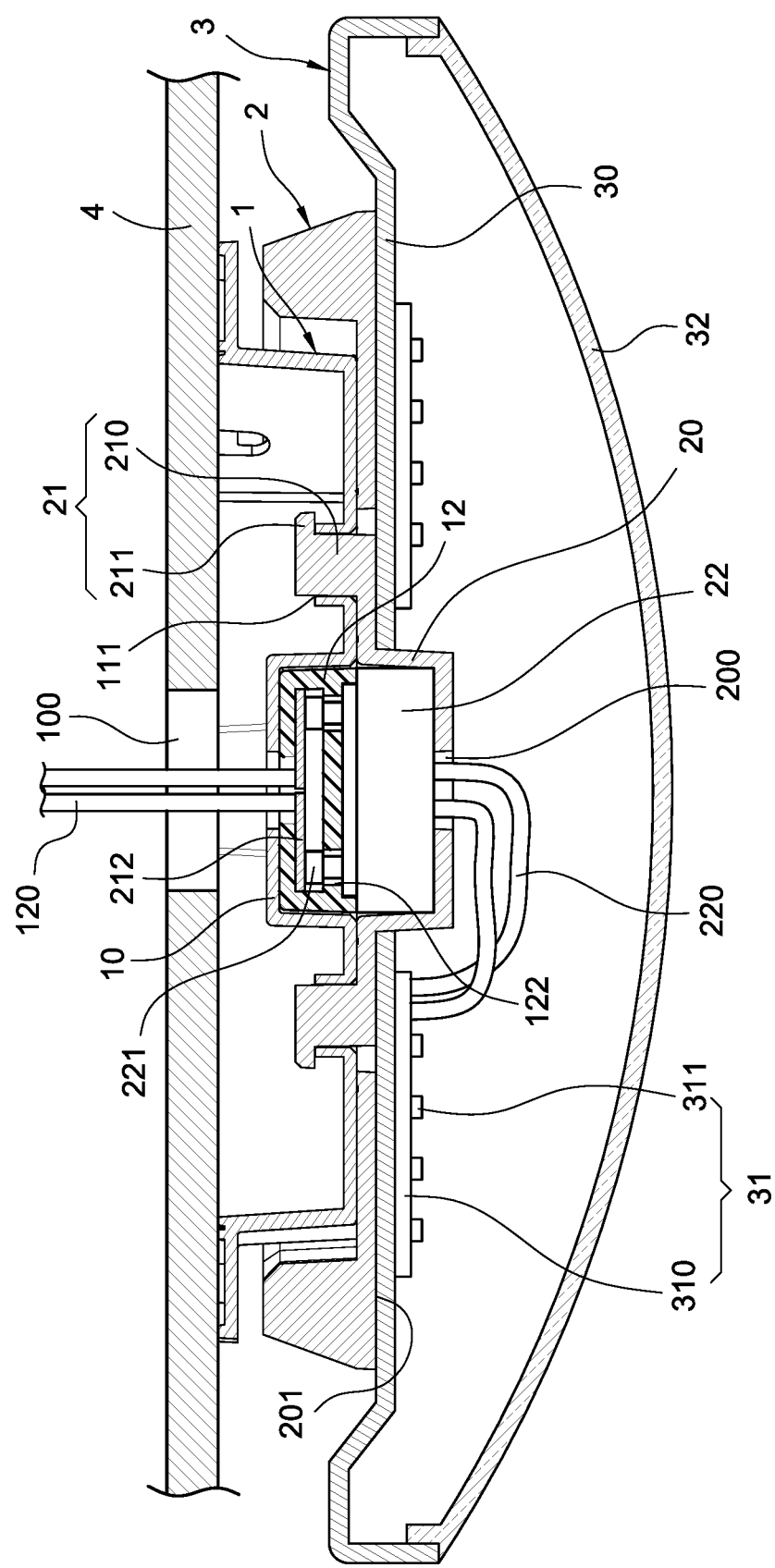
FIG. 8 is a cross-sectional view along line 8-8 in FIG. 7.

As shown in FIGS. 6-7 and step S4 in FIG. 1, the lamp fixing seat 2 is rotated about the first and second power connectors 12, 22 so as to make the two fasteners 21 are separately engaged with the arced channels 110 to fix the lamp fixing seat 2 to the lamp power seat 1. In detail, as shown in FIG. 8, the fastener 21 has a neck 210 and a flange 211 extending from an end of the neck 210. The flange 211 is smaller than the enlarged hole 111 to allow the fastener 21 to enter the enlarged hole 111. When the fastener 21 slide in the arced channel 110, the flange 211 is wider than the neck 210 and protrudes from the arced channel 110, so the lamp fixing seat 2 can be fastened to the lamp power seat 1.

Please refer to FIG. 8. In step S3 of FIG. 1, the lamp 3 can be first fastened to the lamp installing portion 201 of the lamp fixing seat 2, and then they both are fastened to the lamp power seat 1. The lamp 3 may include a disk 30, at least one lighting unit 31 disposed on the disk 30 and a cover 32 connected to the disk 30. The lighting unit 31 further includes a circuit board 310 and light emitting diodes (LEDs) 311 mounted on the circuit board 310. The wire 220 of the second power connector 22 passes a second through hole 200 in the second receiving portion 20 to make an electric connection between the wire 220 and the lighting unit 31 or the circuit board 310.

Accordingly, the lamp power assembling structure and method of the invention first installs the lamp power seat 1 onto the mounting place 4, and then rotate the lamp fixing seat 2 about the power connectors 12, 22 to make engagement so as to convenient to install, replace or repair a lamp 3.

It will be appreciated by persons skilled in the art that the above embodiment has been described by way of example only and not in any limitative sense, and that various alterations and modifications are possible without departure from the scope of the disclosed example as defined by the appended claims.

What is claimed is:

1. A lamp power assembling structure for being installed indoors and connecting an indoor power source, comprising:
    a lamp power seat, having a first power connector and at least two sliding trenches, the first power connector having a wire for connecting to the indoor power source, each sliding trench having an arced channel and an enlarged hole formed at an end of the arced channel, and the arced channels being arcedly arranged around the first power connector; and
    a lamp fixing seat, connected to the lamp power seat, having a second power connector corresponding to the first power connector and two fasteners separately corresponding to the two enlarged holes;
    wherein the two fasteners are separately correspondingly inserted into the two enlarged holes, and the lamp fixing seat is rotated about the first and second power connectors so as to make the two fasteners to be separately engaged with the arced channels to fix the lamp fixing seat to the lamp power seat, and
    wherein the lamp power seat is integrally formed with a first receiving concave, the first power connector is received in the first receiving concave, the lamp fixing seat is formed with a second receiving concave, and the second power connector is received in the second receiving concave.

2. The lamp power assembling structure of claim 1, wherein the first receiving concave is formed with a first through hole to allow a wire of the first power connector to pass through.

3. The lamp power assembling structure of claim 1, wherein each fastener has a neck and a flange extending from an end of the neck.

4. The lamp power assembling structure of claim 1, wherein the second power connector is disposed on a side of the lamp fixing seat, and another side of the lamp fixing seat is formed with a lamp installing portion.

5. The lamp power assembling structure of claim 4, further comprising a lamp connected to the lamp installing portion.

6. The lamp power assembling structure of claim 5, wherein the lamp comprises a disk, at least one lighting unit disposed on the disk and a cover connected to the disk.

7. The lamp power assembling structure of claim 6, wherein a wire of the second power connector electrically connects to the lighting unit.

\* \* \* \* \*